(12) United States Patent
Sueishi

(10) Patent No.: US 9,950,571 B2
(45) Date of Patent: Apr. 24, 2018

(54) MOTORCYCLE TIRE

(71) Applicant: SUMITOMO RUBBER INDUSTRIES, LTD., Kobe-shi, Hyogo (JP)

(72) Inventor: Makoto Sueishi, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 218 days.

(21) Appl. No.: 14/850,332

(22) Filed: Sep. 10, 2015

(65) Prior Publication Data

US 2016/0101654 A1    Apr. 14, 2016

(30) Foreign Application Priority Data

Oct. 8, 2014 (JP) .................................. 2014-207467

(51) Int. Cl.
*B60C 11/11* (2006.01)
*B60C 11/03* (2006.01)

(52) U.S. Cl.
CPC ........... *B60C 11/0302* (2013.01); *B60C 11/11* (2013.01); *B60C 2200/10* (2013.01); *B60C 2200/14* (2013.01)

(58) Field of Classification Search
CPC . B60C 11/0302; B60C 11/11; B60C 2200/10; B60C 2200/14

USPC .... 152/209.11; D12/534–536, 506, 569–571
See application file for complete search history.

(56) References Cited

U.S. PATENT DOCUMENTS

2002/0026971 A1    3/2002  Matsumura
2012/0024443 A1*   2/2012  Ishida .................... B60C 11/11
                                                        152/209.18

FOREIGN PATENT DOCUMENTS

EP    1792753 A1    6/2007
FR    2811939 A1    1/2002
JP    2005-193784 A 7/2005

OTHER PUBLICATIONS

Extended European Search Report, dated Mar. 7, 2016, for European Application No. 15186098.8.

* cited by examiner

*Primary Examiner* — Robert C Dye
(74) *Attorney, Agent, or Firm* — Birch, Stewart, Kolasch & Birch, LLP

(57) ABSTRACT

A motorcycle tire comprises a tread portion provided with a block pattern. The block pattern comprises block groups each consisting of at least five blocks Bg arranged along an oblique zone X so that the centroids M of the treads of the blocks Bg are positioned within the oblique zone X. The oblique zone X has a width of not more than 4 mm. The oblique zone X is inclined at an angle α of from 1 to 10 degrees with respect to the tire circumferential direction.

10 Claims, 6 Drawing Sheets

MOTORCYCLE TIRE

BACKGROUND OF THE INVENTION

The present invention relates to a motorcycle tire, more particularly to a block tread pattern capable of satisfying both of grip performance on hard ground surface and grip performance on soft ground surface at a highly sophisticated level and suitable for riding on rough terrain.

In a motorcycle tire for riding on rough terrain, for example, for use in motocross, the tread portion is usually provided with a block pattern.

When riding on hard ground surface, for example, dry unpaved road surface, such block pattern tire exert its grip performance by digging edges of the blocks into the ground surface, namely, by the edge effect of the blocks.
From a standpoint of increasing the edge effect, it is desirable that blocks are arranged so as to stagger along circumferential lines parallel with the tire circumferential direction, namely, not to align in the tire circumferential direction.

When riding on soft ground surface such as muddy unpaved road, it is desirable for better grip performance to allow the blocks to penetrate into the soft ground surface by facilitating the ejection of mud or soil plugged between the blocks.
From a standpoint of facilitating the ejection of mud or soil, it is desirable that the blocks are arranged in circumferential rows to form a circumferentially continuously extending grooved part (linear groove) between the block rows.
In this case, however, the edge effect is sacrificed and the grip performance on hard ground surface is deteriorated.

Thus, it is difficult to satisfy both of the grip performance on hard ground surface and the grip performance on soft ground surface (muddy road).

SUMMARY OF THE INVENTION

It is therefore, an object of the present invention to provide a motorcycle tire, in which both of the grip performance on hard ground surface and the grip performance on soft ground surface (muddy road) are satisfied at a highly sophisticated level.

According to the present invention, a motorcycle tire comprises a tread portion provided with a block pattern, the block pattern comprising one or more block groups each consisting of at least five blocks arranged along an oblique zone so that the centroids of the treads of the blocks are positioned within the oblique zone,
the oblique zone having a width of not more than 4 mm, and the oblique zone inclined at an angle $\alpha$ of from 1 to 10 degrees with respect to the tire circumferential direction.

Further, the motorcycle tire according to the present invention may have the following features (1)-(3):
(1) each block has side edges E1 and E2 which are opposite in the tire axial direction, the side edge E1 having an angle $\beta 1$ with respect to the tire circumferential direction whose difference from the angle $\alpha$ is not more than 5 degrees, and the side edge E2 having an angle $\beta 2$ with respect to the tire circumferential direction whose difference from the angle $\alpha$ of the oblique zone to which the concerned block belongs, is not more than 5 degrees;
(2) each block has a heel-side edge E3 and a toe-side edge E4 which are opposite in the tire circumferential direction, the heel-side edge E3 having an angle $\beta 3$ of not more than 10 degrees with respect to the tire axial direction, and the toe-side edge E4 having an angle $\beta 4$ of from 5 to 25 degrees with respect to the tire axial direction and inclined to the toe-side toward the axially outside;
(3) the blocks belonging to the block group have two or more different tread areas, and the largest tread area is not more than 120% of the smallest tread area.

In the motorcycle tire according to the present invention, therefore, the blocks in each block group are gradually shifted in the tire axial direction, corresponding to the inclination angle $\alpha$. Accordingly, with respect to the edge of a block contacting with the ground, the edge of a block subsequently contacting with the ground can dig into the ground surface at an axially shifted different position. As a result, the edge effect of the blocks as a whole is improved. Thus, the grip performance on relatively hard ground surface can be improved.

In the tread portion, grooved parts are formed between the block groups, and the grooved parts extend linearly in the developed tread pattern (in actuality, the grooved parts extend helically). Thereby, the ejection of mud or soil is expedited, and the grip performance on soft ground surface (muddy road) can be improved.

Thus, the motorcycle tire according to the present invention can satisfy both of the grip performance on relatively hard ground surface and the grip performance on soft ground surface (muddy road) at a highly sophisticated level.

DESCRIPTION OF THE PREFERRED EMBODIMENTS

Figure 1:
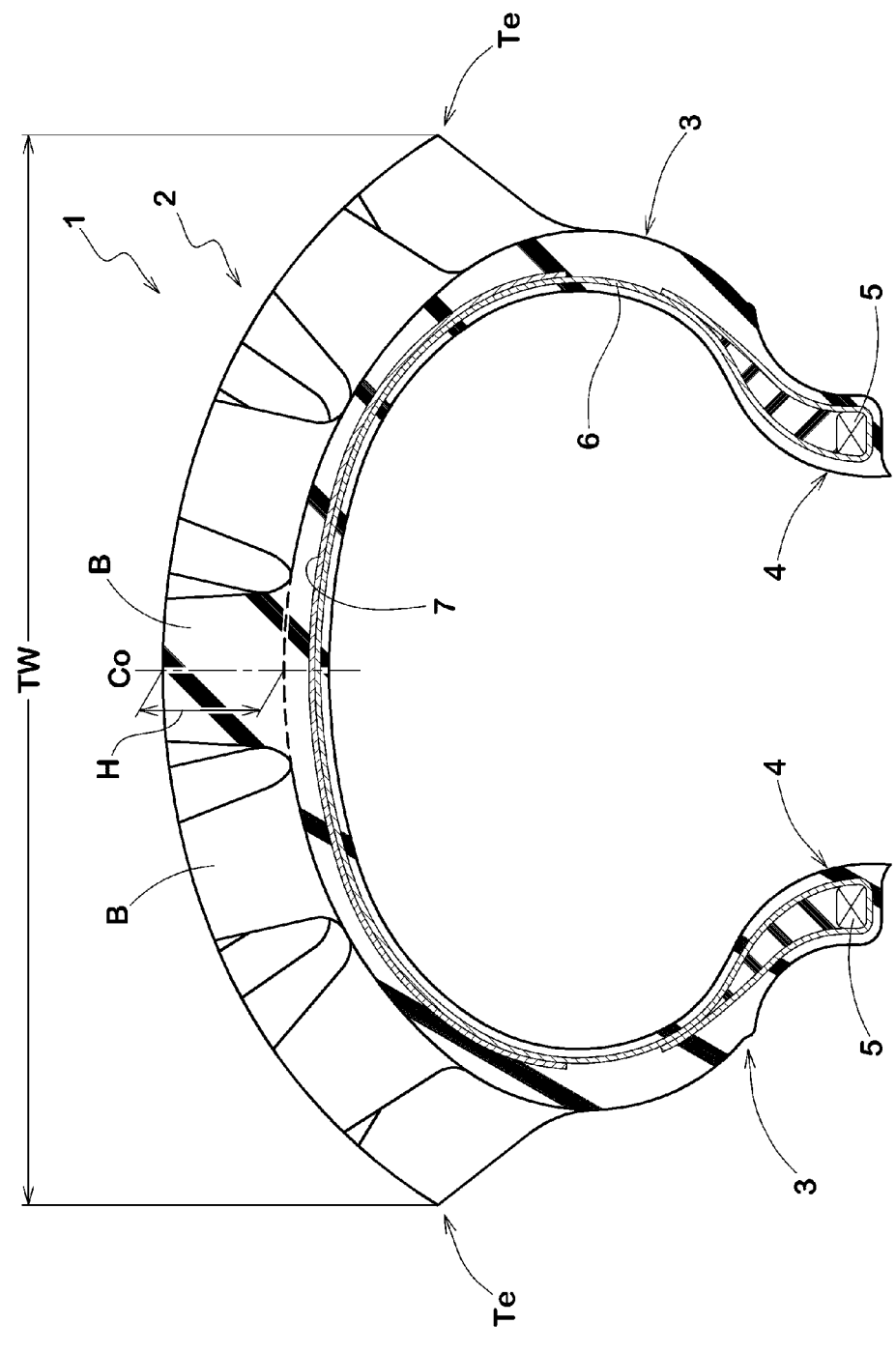
FIG. 1 is a cross sectional view of a motorcycle tire as an embodiment of the present invention.

Embodiments of the present invention will now be described in detail in conjunction with the accompanying drawings.

In the drawings, motorcycle tire 1 according to the present invention is a pneumatic tire comprising a tread portion 2, a pair of bead portions 4 each with a bead core 5 therein, a pair of sidewall portions 3 extended therebetween, a carcass 6 extending between the bead portions 4 through the tread portion 2 and the sidewall portions 3, and a tread reinforcing cord layer 7 disposed radially outside the carcass 6 in the tread portion 2.

As a characteristic of a motorcycle tire, the tread portion 2 (inclusive of the carcass 6, tread reinforcing cord layer 7 and a tread rubber thereon) is convexly curved as shown in FIG. 1 so that the tread face between the tread edges Te is curved like an arc swelling radially outwardly, and the maximum cross sectional width of the tire 1 occurs between the tread edges Te, namely, equals to the axial tread width TW.

The motorcycle tire 1 is provided in the tread portion 2 with a block pattern designed to be adaptable to a wide range of road conditions including relatively hard ground surfaces and soft ground surface such as muddy road in order that the motorcycle tire 1 can be suitably used as a race tire for riding on rough terrain.

The tread portion 2 is provided with a plurality of blocks B defining the block pattern.

The land ratio of the tread portion 2, which is a ratio of the total area of the treads of the blocks B (hereinafter, the block tread) to the overall area of the tread of the tire (hereinafter, the tire tread), may be defined arbitrarily. But, the land ratio is preferably set in a range of from 10% to 30%.

The block pattern includes one or more block groups G each consisting of at least five blocks Bg arranged along an oblique zone X so that the centroids M of their block treads are positioned within the oblique zone X.

Figure 2:
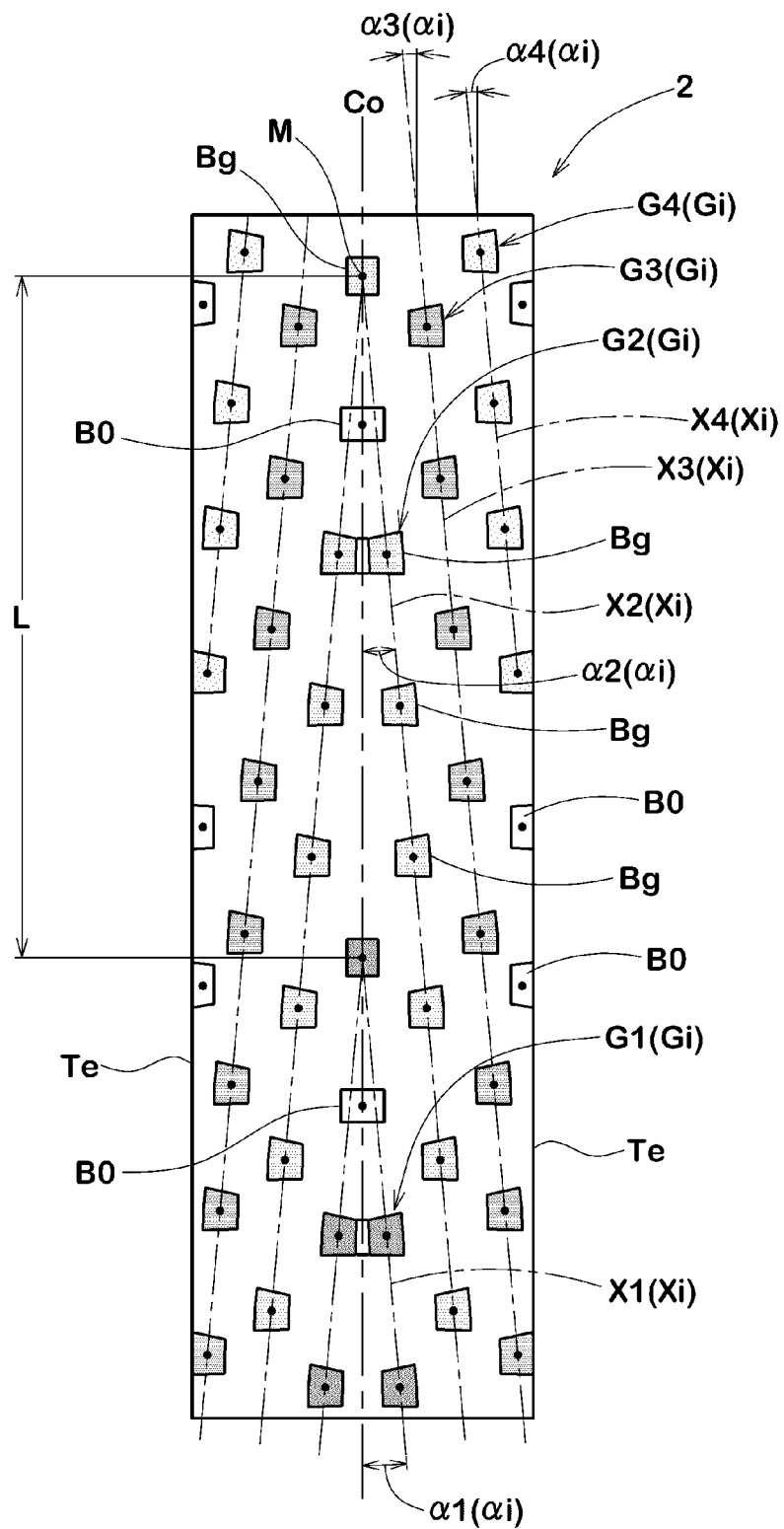
FIG. 2 is a developed partial view of the tread portion thereof showing a tread pattern.
Figure 6:
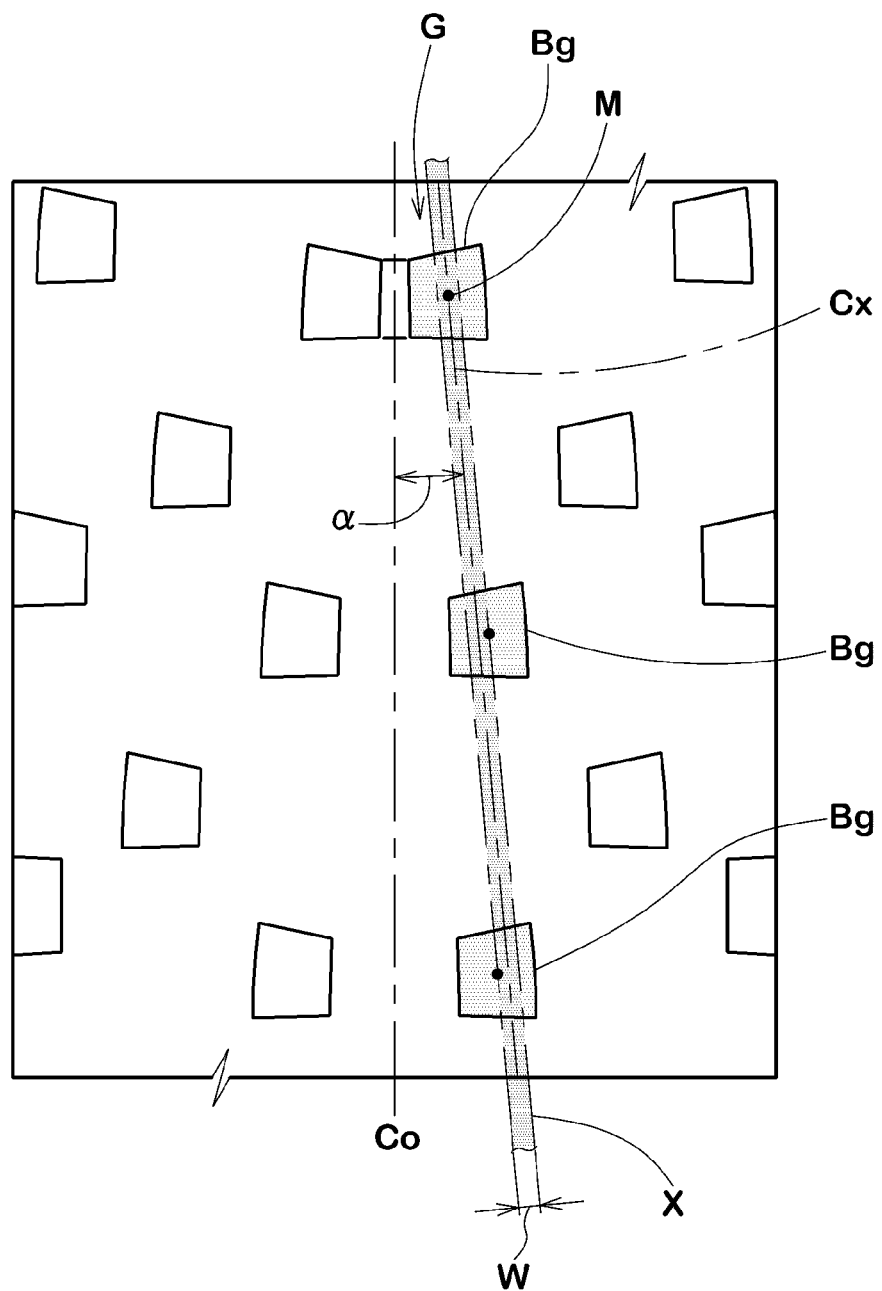
FIG. 6 is a developed partial view of the tread pattern for explaining the width and inclination angle of the oblique zone.

As shown in FIG. 2 where the tread pattern is developed into a flat form no more curved around the tire rotational axis and no more curved in the tire meridian section,
the oblique zone X is defined as having its widthwise center line Cx extends straight and inclined at an angle α of from 1 to 10 degrees with respect to the tire circumferential direction and a width W of not more than 4 mm, preferably not more than 2.0 mm along the length thereof as shown in FIG. 6.

Figure 4:
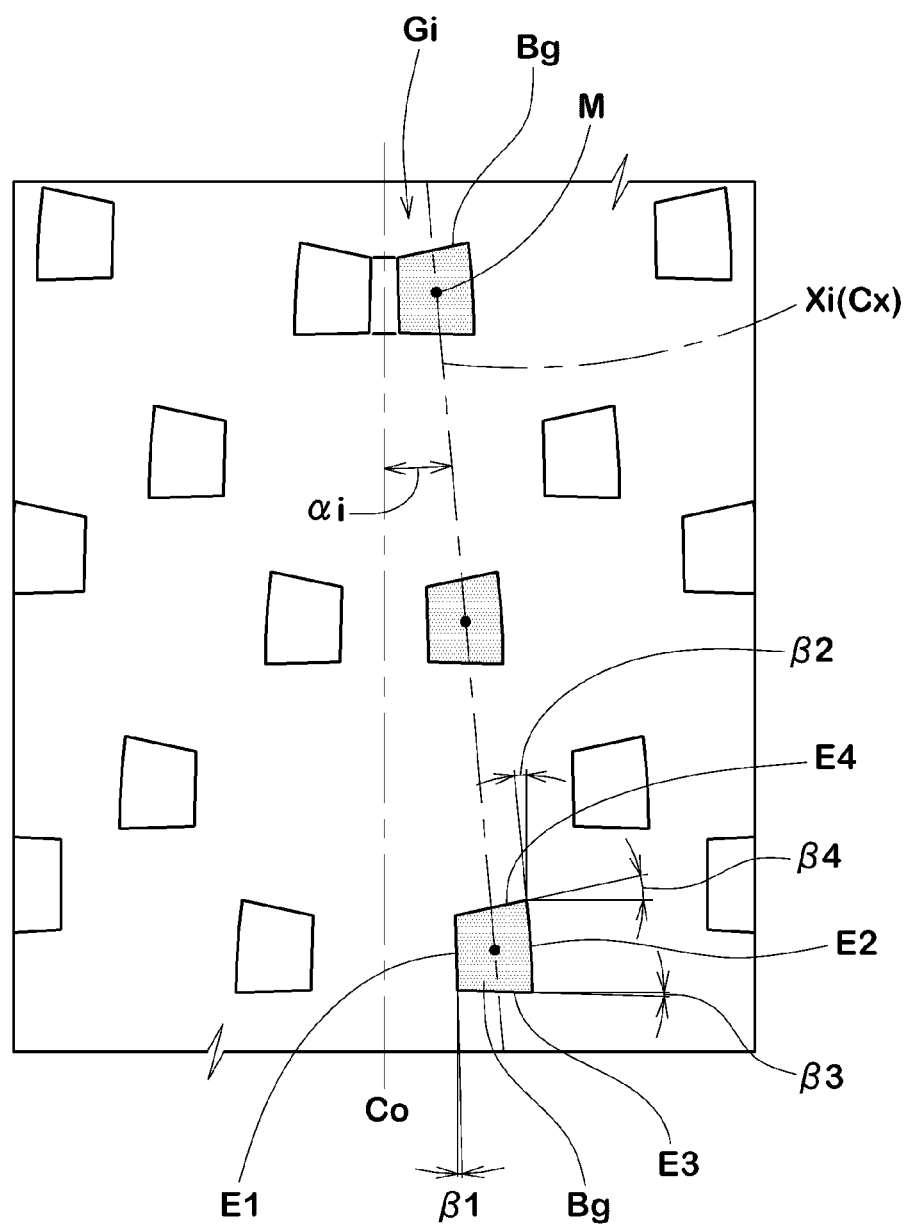
FIG. 4 is a developed enlarged partial view showing the tread pattern.

In FIGS. 2, 4 and 5, for the sake of simplicity, the oblique zones X are indicated by their widthwise center lines Cx, and the centroids M are indicated as positioned on the widthwise center lines Cx.

In the example shown in FIG. 2, the block pattern includes a plural number (n) of block groups Gi (i=1 to n) on each side of the tire equator Co.

One half of the block pattern on one side of the tire equator is line symmetric of the other one half, wherein one half may be shifted from the other in the tire circumferential direction.
In FIG. 2, one half is not shifted from the other, and accordingly, the block pattern is line symmetric about the tire equator Co.

In this example, the angles αi of all of the oblique zones Xi have the same values. Therefore, on each side of the tire equator, the oblique zones Xi are parallel with each other.

On each side of the tire equator, the oblique zones Xi are disposed at intervals L when measured in the tire circumferential direction between the widthwise center lines Cx. The intervals L may be constant or may be variable according to a variable pitching method.

In this example, each block group Gi consists of ten blocks Bg.

In this example, the axially innermost block Bg in each block group Gi is positioned on the tire equator Co, and the axially outermost block Bg is positioned at the tread edge Te. Obviously, the geometrical arrangement of the axially innermost and outermost blocks Bg is not limited thereto.

In addition, the block pattern may include blocks B0 not belonging to any block group Gi. In such case, it is preferable that the number of the blocks B0 is not more than 30%, more preferably not more than 25% of the total number of the blocks B. In this embodiment, as shown in FIG. 2, the blocks B0 are disposed at the tire equator Co and each tread edge Te. Aside from these positions, the blocks B0 are not disposed anywhere.

In each block group Gi, corresponding to the inclination angle αi, the blocks Bg are gradually shifted in the tire axial direction. Therefore, with respect to the edge of a block Bg contacting with the ground, the edge of a block Bg subsequently contacting with the ground can dig into the ground surface at an axially shifted different position. As a result, the edge effect of the blocks Bg as a whole is improved.

Figure 3:
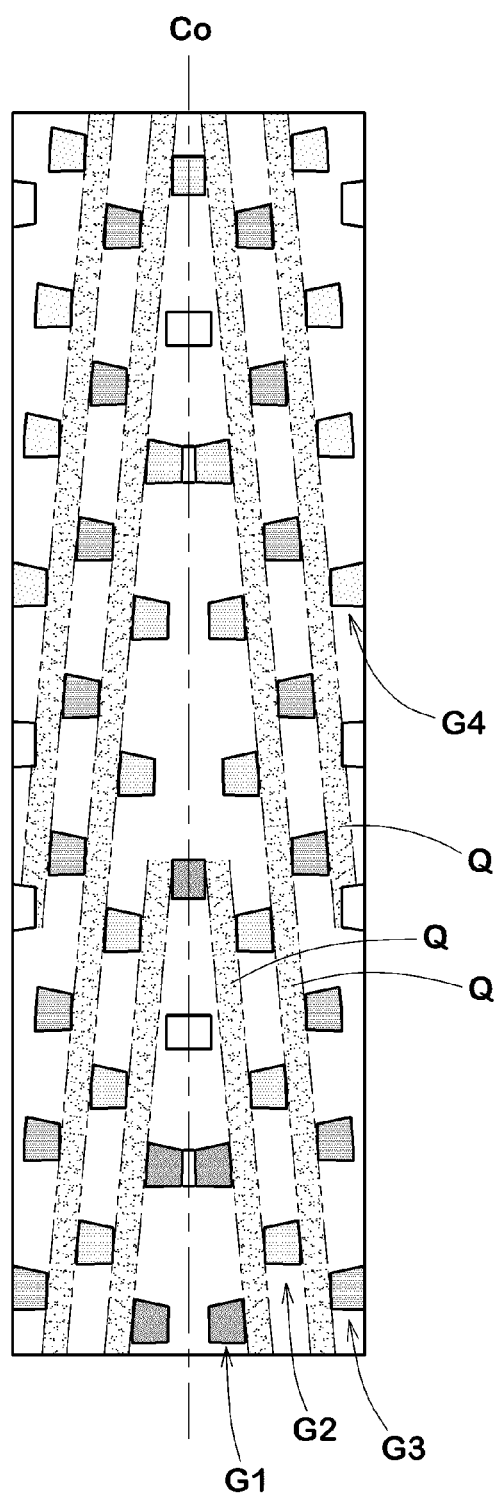
FIG. 3 is the same developed partial view as in FIG. 2 for explaining linear grooved parts formed between the block groups.

The tread pattern comprises grooved parts Q formed between the block groups Gi as shown in FIG. 3. In FIG. 3 or in the developed tread pattern, the grooved parts Q extend linearly (in actuality, the grooved parts Q extend helically). Thereby, the ejection of mud or soil can be expedited.
The linear grooved part Q is inclined at an angle α with respect to the tire circumferential direction. Thereby, the mud or soil is ejected rearward and axially outward by the spinning of the tire. As a result, the ejected mud or soil can be prevented from being again trapped between the blocks.

If the angle αi is not more than 1 degree, the edge effect can not be improved. If the angle αi is more than 10 degrees, it becomes difficult to improve the ejection of mud or soil. From this standpoint, it is preferable that the angle αi is not less than 4 degrees and not more than 7 degrees.

If the number m of the blocks Bg in each block group Gi is 5 or more, the above mentioned advantageous effect can be obtained. However, if the number m exceeds 10, the improvement reaches a ceiling. Rather, it is disadvantageous to the strength and wear resistance of the blocks since downsizing is imposed on the blocks. Accordingly, it is preferable that the number m of the blocks Bg is not more than 10.

It is preferable that, as shown in FIG. 4, each block Bg belonging to any one of the block groups Gi has two side edges E1 and E2 opposite in the tire axial direction, wherein the side edge E1 has an angle β1 with respect to the tire circumferential direction Co whose difference from the angle αi is not more than 5 degrees, and the side edge E2 has an angle β2 with respect to the tire circumferential direction Co whose difference from the angle αi is not more than 5 degrees.

If the angles β1 and β2 are equal to the angle αi, the linear grooved part Q has a substantially constant width. Therefore, the mud or soil in the linear grooved part Q can be easily ejected in a continuous state and the ejection of mud or soil can be further improved.

If the difference |β1−αi|, |β2−αi| from the angle αi exceeds 5 degrees, the mud or soil in the linear grooved part Q is broken during being ejected, and the mud or soil tends to partially remain in the linear grooved part Q.
Further, it is preferable that each block Bg belonging to any one of the block groups Gi has a heel-side edge E3 and a toe-side edge E4 which are opposite in the tire circumferential direction.

The toe-side edge E4 has an angle β4 of not less than 5 degrees, preferably not less than 10 degrees, but not more than 25 degrees, preferably not more than 20 degrees with respect to the tire axial direction and inclined to the toe-side toward the axially outside.
The heel-side edge E3 has an angle β3 of not more than 10 degrees with respect to the tire axial direction.
The heel-side edge E3 may be inclined to the toe-side or the heel-side toward the axially outside.

If the angle β3 of the heel-side edge E3 exceeds 10 degrees, the penetration of the block Bg into the soft ground surface (muddy road) becomes insufficient, and there is a possibility that the grip performance on soft ground surface (muddy road) is deteriorated.
On the relatively hard ground surfaces, a traction force in the tire circumferential direction obtained by the edge effect is decreased, and also the grip performance on relatively hard ground surface is deteriorated.

Since the toe-side edge E4 of the block Bg is inclined to the toe-side toward the axially outside, the block rigidity becomes increased toward the axially outside, and deformation of the block during cornering can be reduced.

Further, by increasing the angle β4 of the toe-side edge E4, the circumferential component of the edge is increased to reduce skidding, and the slide control performance during cornering can be improved.

If the angle β4 is less than 5 degrees, it becomes difficult to obtain the above described advantageous effects. If the angle β4 exceeds 25 degrees, the circumferential component becomes large for the axial component, and it becomes difficult to improve the slide control performance. On soft ground surface (muddy road), penetration of the block Bg into the ground is reduced and the grip performance is deteriorated.

In the blocks Bg belonging to the block groups Gi, if the block treads have two or more different areas S, it is preferable that the largest area Smax is not more than 120% of the smallest area Smin.

If a motorcycle tire is provided in the tread portion with blocks having different rigidities, it is difficult to discriminate reactions from a road surface. Therefore, it is difficult for the rider to accurately judge whether the tire can grip the ground or not, and the reliability of the grip performance of such tire is decreased.

Further, the blocks having lower rigidity are worn earlier than the blocks having higher rigidity. As a result, the durability of the tire as a whole is decreased.

In this example, therefore, the ratio of the tread area Smax of the largest block to the tread area Smin of the smallest block is set in a range of not more than 1.20 in order to reduce the variation in the block rigidity. Thereby, the reliability of the grip performance is increased, and the durability is improved.

Aside from a quadrilateral shape, the contour shape of the block tread of the block Bg may be a pentagonal shape, a hexagonal shape or the like as far as it has the above-mentioned four edges E1, E2, E3 and E4. In such case, the total length of the other edge(s) than the four edges E1, E2, E3 and E4 should be less than the total length of the four edges E1, E2, E3 and E4.

In the blocks Bg belonging to the block groups Gi, if the blocks Bg have two or more different heights H, it is preferable that the smallest height Hmin is not less than 70%, preferably not less than 80% of the largest height Hmax in order to decrease the variation in rigidity of the blocks.

Figure 5B:
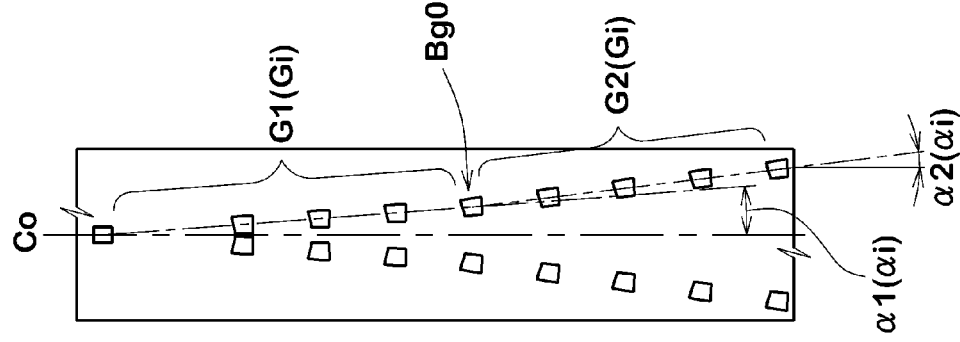
FIGS. 5(A) and 5(B) are diagrams for explaining further examples of the geometrical arrangement of the block groups.
Figure 5A:
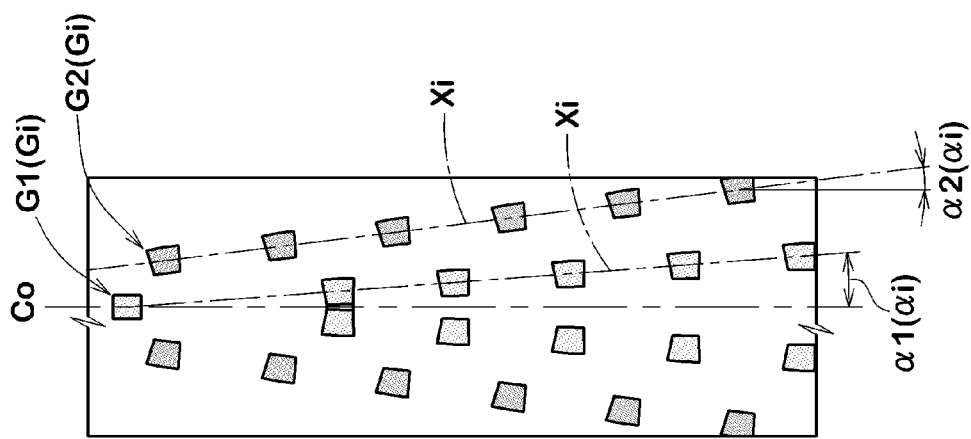

FIG. 5(A) shows another example of the geometrical arrangement of the oblique zones Xi. In this example, the oblique zones Xi have different angles αi within the above-mentioned range of from 1 to 10 degrees.

FIG. 5(B) shows still another example of the geometrical arrangement of the oblique zones Xi. In this example, two oblique zones Xi having different angles αi are arranged in series in the form of one bent zone. In such case, the two block groups Gi may have a common block Bg0 at their junction.

Aside from such arrangement, the symmetrical arrangement shown in FIG. 2 in which each of the oblique zones Xi on one side of the tire equator and one of the oblique zones Xi on the other side of the tire equator intersect with each other at the tire equator, the two block groups Gi may have a common block Bg positioned on the tire equator.

While description has been made of particularly preferable embodiments of the present invention, the illustrated embodiments should not be construed as to limit the scope of the present invention; various modifications are possible without departing from the scope of the present invention.

Comparison Tests

Based on the block pattern shown in FIG. 2, motorcycle tires for riding on rough terrain having the internal structure shown in FIG. 1 and specifications listed in Table 1 were experimentally manufactured and tested for the grip performance on hard ground surface, grip performance on soft ground surface (muddy road) and slide control performance.

The test tire (size: 80/100-21, tire pressure: 80 kPa) was mounted on a front wheel (rim size: 21×1.60) of a 450 cc four-stroke motocross/off-road racing bike with the rear wheel (rim size: 19×2.15) on which a commercially available motocross tire (tire size: 120/80-19, tire pressure: 80 kPa) was mounted. And, during running in a motocross racing course, the grip performance on hard ground surface, the grip performance on soft ground surface (muddy road) and the slide control performance were evaluated by the test rider into ten ranks, wherein the higher rank number is better. The results are shown in Table 1.

From the test results, it was confirmed that the motorcycle tires according to the present invention can satisfy both of the grip performance on relatively hard ground surface the grip performance on soft ground surface at a highly sophisticated level.

TABLE 1

| Tire | Ref. 1 | Ref. 2 | Ex. 1 | Ex. 2 | Ex. 3 | Ex. 4 | Ex. 5 | Ex. 6 | Ex. 7 | Ex. 8 | Ref. 3 |
|---|---|---|---|---|---|---|---|---|---|---|---|
| block group | none | | | | | | | | | | |
| number n of blocks | 0 | 4 | 10 | 5 | 7 | 12 | 14 | 10 | 10 | 10 | 10 |
| angle α (deg.) | 0 | 5 | 5 | 5 | 5 | 5 | 5 | 1 | 2 | 10 | 12 |
| angle β1(deg.) | 0 | 5 | 5 | 5 | 5 | 5 | 5 | 5 | 5 | 5 | 5 |
| angle β2(deg.) | 0 | 5 | 5 | 5 | 5 | 5 | 5 | 5 | 5 | 5 | 5 |
| angle β3(deg.) | 0 | 7 | 7 | 7 | 7 | 7 | 7 | 7 | 7 | 7 | 7 |
| angle β4(deg.) | 0 | 13 | 13 | 13 | 13 | 13 | 13 | 13 | 13 | 13 | 13 |
| block tread area ratio Smax/Smin (%) | 130 | 100 | 100 | 100 | 100 | 100 | 100 | 100 | 100 | 100 | 100 |
| grip performance on hard ground surface | 5 | 6.5 | 8 | 7 | 7.5 | 8 | 8 | 7 | 8 | 8 | 8 |
| grip performance on soft ground surface | 5 | 4 | 7 | 7 | 7 | 7 | 7 | 7 | 7 | 7 | 4 |
| slide control performance | 5 | 7 | 7 | 7 | 7 | 7 | 7 | 7 | 7 | 7 | 7 |

| Tire | Ex. 9 | Ex. 10 | Ex. 11 | Ex. 12 | Ex. 13 | Ex. 14 | Ex. 15 | Ex. 16 | Ex. 17 | Ex. 18 | Ex. 19 | Ex. 20 |
|---|---|---|---|---|---|---|---|---|---|---|---|---|
| block group | | | | | | | | | | | | |
| number n of blocks | 10 | 10 | 10 | 10 | 10 | 10 | 10 | 10 | 10 | 10 | 10 | 10 |
| angle α (deg.) | 5 | 5 | 5 | 5 | 5 | 5 | 5 | 5 | 5 | 5 | 5 | 5 |

TABLE 1-continued

| | | | | | | | | | | | | |
|---|---|---|---|---|---|---|---|---|---|---|---|---|
| angle β1(deg.) | 0 | 10 | 5 | 5 | 5 | 5 | 5 | 5 | 5 | 5 | 5 | 5 |
| angle β2(deg.) | 5 | 5 | 0 | 10 | 5 | 5 | 5 | 5 | 5 | 5 | 5 | 5 |
| angle β3(deg.) | 7 | 7 | 7 | 7 | −10 | 0 | 10 | 7 | 7 | 7 | 7 | 7 |
| angle β4(deg.) | 13 | 13 | 13 | 13 | 13 | 13 | 13 | 5 | 20 | 25 | 13 | 13 |
| block tread area ratio Smax/Smin (%) | 100 | 100 | 100 | 100 | 100 | 100 | 100 | 100 | 100 | 100 | 105 | 110 |
| grip performance on hard ground surface | 8 | 8 | 8 | 8 | 7 | 8 | 7 | 7 | 7 | 7 | 8 | 8 |
| grip performance on soft ground surface | 6.5 | 6.5 | 6.5 | 6.5 | 6 | 7 | 6 | 7 | 7 | 6 | 7 | 7 |
| slide control performance | 7 | 7 | 7 | 7 | 7 | 7 | 7 | 6 | 7.5 | 7 | 6 | 7 |

REFERENCE SIGNS LIST 1 motorcycle tire
2 tread portion
B block
Co tire equator
E1 block's side edge
E2 block's side edge
E3 block's heel-side edge
E4 block's toe-side edge
G block group
M block tread's centroid
X oblique zone

The invention claimed is:

1. A motorcycle tire comprising:
a tread portion provided with a block pattern,
wherein the block pattern comprises block groups each consisting of at least five blocks consecutively arranged along an oblique zone so that the centroids of the treads of the blocks are positioned within the oblique zone,
the oblique zone having a constant width of not more than 4 mm, and
the oblique zone is inclined at a constant angle α of from 4 to 10 degrees with respect to the tire circumferential direction.

2. The motorcycle tire according to claim 1, wherein each said block has two side edges which are opposite in the tire axial direction, each side edge having an angle with respect to the tire circumferential direction whose difference from the angle α of the oblique zone to which the concerned block belongs, is not more than 5 degrees.

3. The motorcycle tire according to claim 2, wherein each said block has a heel-side edge and a toe-side edge which are opposite in the tire circumferential direction,
the heel-side edge is at an angle of not more than 10 degrees with respect to the tire axial direction, and
the toe-side edge is at an angle of from 5 to 25 degrees with respect to the tire axial direction and inclined to a toe-side toward the axially outside.

4. The motorcycle tire according to claim 3, wherein the blocks belonging to said block groups have two or more different tread areas, and the largest tread area is not more than 120% of the smallest tread area.

5. The motorcycle tire according to claim 2, wherein the blocks belonging to said block groups have two or more different tread areas, and the largest tread area is not more than 120% of the smallest tread area.

6. The motorcycle tire according to claim 1, wherein each said block has a heel-side edge and a toe-side edge which are opposite in the tire circumferential direction,
the heel-side edge is at an angle of not more than 10 degrees with respect to the tire axial direction, and
the toe-side edge is at an angle of from 5 to 25 degrees with respect to the tire axial direction and inclined to a toe-side toward the axially outside.

7. The motorcycle tire according to claim 6, wherein the blocks belonging to said block groups have two or more different tread areas, and the largest tread area is not more than 120% of the smallest tread area.

8. The motorcycle tire according to claim 1, wherein the blocks belonging to said block groups have two or more different tread areas, and the largest tread area is not more than 120% of the smallest tread area.

9. The motorcycle tire according to claim 1, wherein each of the block groups includes a block having a centroid positioned at the tire equator.

10. The motorcycle tire according to claim 1, wherein the block groups are arranged symmetrically about the tire equator.

* * * * *